(12) United States Patent  (10) Patent No.: US 8,554,994 B2
Resch  (45) Date of Patent: Oct. 8, 2013

(54) DISTRIBUTED STORAGE NETWORK UTILIZING MEMORY STRIPES

(75) Inventor: Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 310 days.

(21) Appl. No.: 12/777,887

(22) Filed: May 11, 2010

(65) Prior Publication Data

US 2011/0078371 A1  Mar. 31, 2011

Related U.S. Application Data

(60) Provisional application No. 61/246,876, filed on Sep. 29, 2009.

(51) Int. Cl.
*G06F 12/16* (2006.01)
(52) U.S. Cl.
USPC .......................... 711/114; 711/170; 711/216
(58) Field of Classification Search
USPC .................................................. 711/114, 170
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Kaushikkumar Patel
(74) *Attorney, Agent, or Firm* — Garlick & Markison; Timothy W. Markison

(57) ABSTRACT

Multiple data slices are generated from an original data segment. The data slices are constructed to prevent recovery of the original data segment using a single related data slice, but to allow recovery of the original data segment using fewer than all of the data slices. Each data slice is stored in the same memory stripe as the other data slices. The memory stripe extends across multiple memory devices and multiple different distributed storage units. The memory device in which each data slice is stored can be determined based on a source name associated with each data slice.

11 Claims, 11 Drawing Sheets

(56) References Cited

U.S. PATENT DOCUMENTS

| | | |
|---|---|---|
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,631,023 B1 * | 12/2009 | Kaiser et al. .................. 1/1 |
| 2002/0062422 A1 | 5/2002 | Butterworth et al. |
| 2002/0166079 A1 * | 11/2002 | Ulrich et al. ............... 714/6 |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114350 A1 * | 5/2005 | Rose et al. ............... 707/10 |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2006/0248273 A1 * | 11/2006 | Jernigan et al. ............ 711/114 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 * | 7/2007 | Gladwin et al. ............ 705/40 |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2009/0307422 A1 * | 12/2009 | Galloway et al. ............ 711/114 |
| 2010/0023524 A1 | 1/2010 | Gladwin et al. |
| 2010/0191907 A1 * | 7/2010 | Ish ............................. 711/114 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner computing system 10

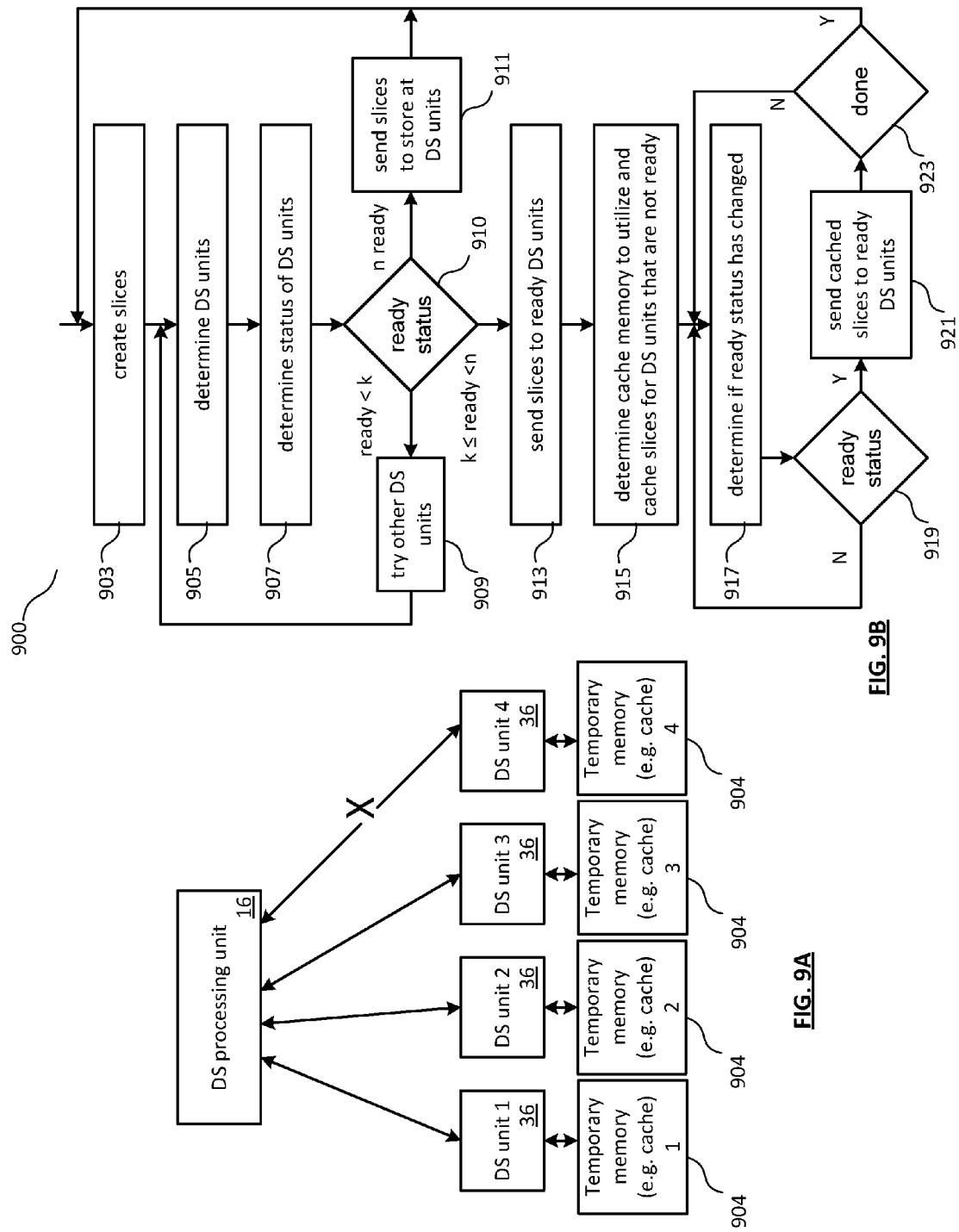

DISTRIBUTED STORAGE NETWORK UTILIZING MEMORY STRIPES

CROSS REFERENCE TO RELATED PATENTS

This application claims the benefit of U.S. Provisional Application No. 61/246,876, filed Sep. 29, 2009, and entitled "DISTRIBUTED STORAGE NETWORK MEMORY UTILIZATION OPTIMIZATION," which is incorporated herein in its entirety by reference for all purposes.

The present application is related to the following co-pending applications:
1. Utility application Ser. No. 12/777,850 filed on even date herewith, and entitled "DISTRIBUTED STORAGE NETWORK INCLUDING MEMORY DIVERSITY";
2. Utility application Ser. No. 12/777,864 filed on even date herewith, and entitled "HANDLING UNAVAILABLE MEMORIES IN DISTRIBUTED STORAGE NETWORK," and
3. Utility application Ser. No. 12/777,904 filed on even date herewith, and entitled "DISTRIBUTED STORAGE NETWORK MEMORY ACCESS BASED ON MEMORY STATE,"

all of which are incorporated herein for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing and more particularly to storage of information.

2. Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed, or manipulated, in accordance with a picture compression standard to produce a standardized compressed picture that can be saved or shared with others. Computer processing capability continues to advance as processing speed advances and software applications that perform the manipulation become more sophisticated.

With the advances in computing processing speed and communication speed, computers manipulate real time media from voice to streaming high definition video. Purpose-built communications devices, like the phone, are being replaced by more general-purpose information appliances. For example, smart phones can support telephony communications but they are also capable of text messaging, and accessing the internet to perform functions including email, web browsing, remote applications access, and media communications. Media communications includes telephony voice, image transfer, music files, video files, real time video streaming and more.

Each type of computing system is constructed, and hence operates, in accordance with one or more communication, processing, and storage standards. With such standards, and with advances in technology, more and more of the global information content is being converted into electronic formats. For example, more digital cameras are now being sold than film cameras, thus producing more digital pictures. High growth rates exist for web based programming that until recently was all broadcast by just a few over the air television stations and cable television providers. Digital content standards, such as used in pictures, papers, books, video entertainment, home video, all enable this global transformation to a digital format. Electronic content pervasiveness is producing increasing demands on the storage function of computing systems.

A typical computer storage function includes one or more memory devices to match the needs of the various operational aspects of the processing and communication functions. For example, a memory device may include solid-state NAND flash, random access memory (RAM), read only memory (ROM), a mechanical hard disk drive. Each type of memory device has a particular performance range and normalized cost. The computing system architecture optimizes the use of one or more types of memory devices to achieve the desired functional and performance goals of the computing system. Generally, the immediacy of access dictates what type of memory device is used. For example, RAM memory can be accessed in any random order with a constant response time. By contrast, memory device technologies that require physical movement such as magnetic discs, tapes, and optical discs, have a variable responses time as the physical movement can take longer than the data transfer.

Each type of computer storage system is constructed, and hence operates, in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a structure such as directories and files. Typically a memory controller provides an interface function between the processing function and memory devices. As new storage systems are developed, the memory controller functional requirements may change to adapt to new standards.

Memory devices may fail, especially those that utilize technologies that require physical movement like a disc drive. For example, it is not uncommon for a disc drive to suffer from bit level corruption on a regular basis, or complete drive failure after an average of three years of use. One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs comprise an array where parity data is added to the original data before storing across the array. The parity is calculated such that the failure of one or more discs will not result in the loss of the original data. The original data can be reconstructed from the other discs. RAID 5 uses three or more discs to protect data from the failure of any one disc. The parity and redundancy overhead reduces the capacity of what three independent discs can store by one third (n−1=3−2=2 discs of capacity using 3 discs). RAID 6 can recover from a loss of two discs and requires a minimum of four discs with an efficiency of n−2. Typical RAID systems utilize a RAID control to encode and decode the data across the array.

Drawbacks of the RAID approach include effectiveness, efficiency and security. As more discs are added, the probability of one or two discs failing rises and is not negligible, especially if more desired less costly discs are used. When one disc fails, it should be immediately replaced and the data reconstructed before a second drive fails. To provide high reliability over a long time period, and if the RAID array is part of a national level computing system with occasional site outages, it is also common to mirror RAID arrays at different physical locations. Unauthorized file access becomes a more acute problem when whole copies of the same file are replicated, either on just one storage system site or at two or more sites. In light of the effectiveness, the efficiency of dedicating 1 to 2 discs per array for the RAID overhead is an issue.

Therefore, a need exists to provide a data storage solution that provides more effective timeless continuity of data, minimizes adverse affects of multiple memory elements failures, provides improved security, can be adapted to a wide variety storage system standards and is compatible with computing and communications systems.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

FIG. 9A is a schematic block diagram of another embodiment of a distributed storage system in accordance with the invention;

FIG. 9B is another flowchart illustrating the writing of memory;

DETAILED DESCRIPTION OF THE INVENTION

Figure 1:
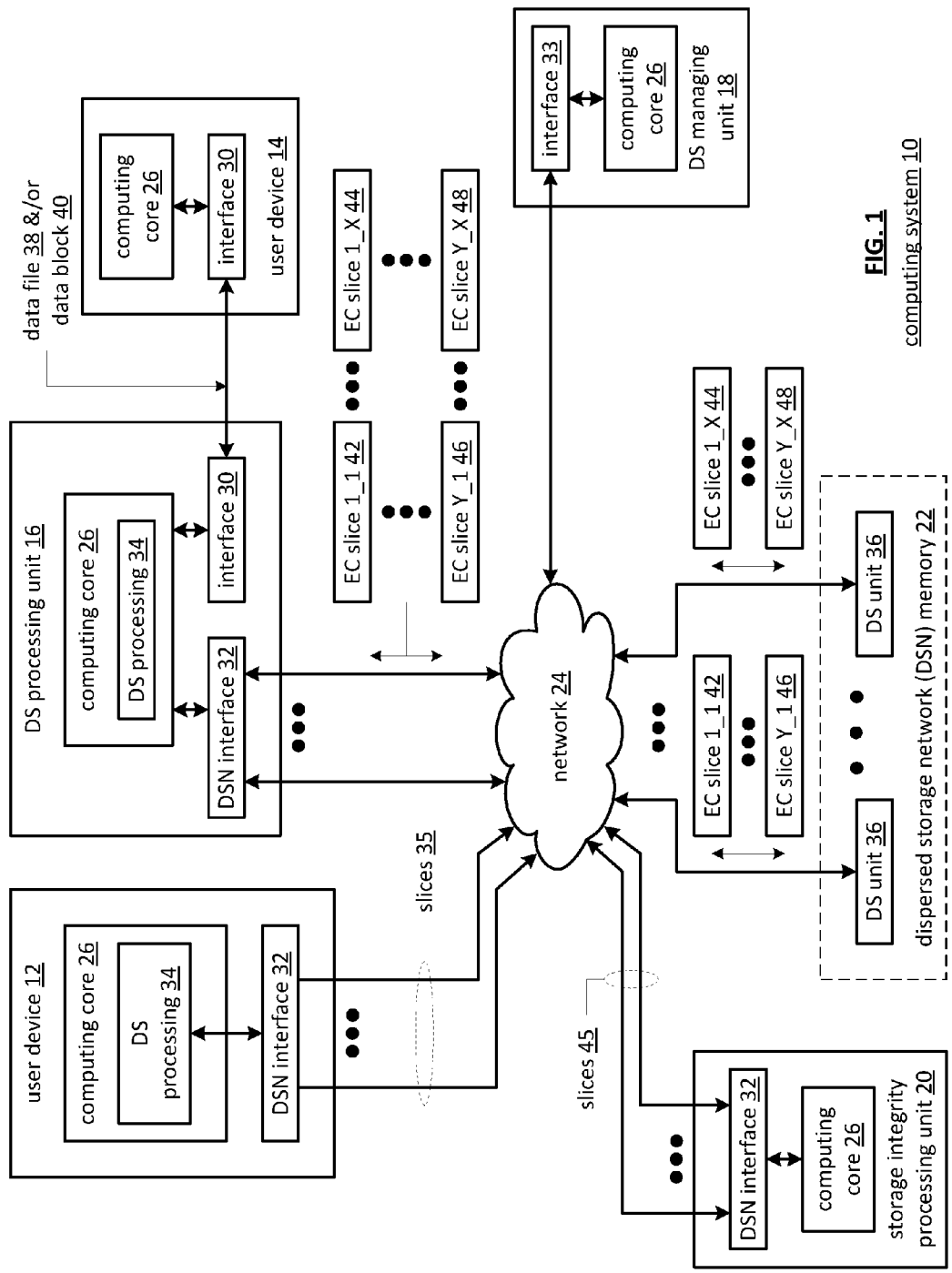
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-11.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.)

between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs the distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a threshold value (e.g., the minimum number of slices required to reconstruct the data segment).

As another example, the DS managing module 18 may create and store locally or within the DSN memory 22 user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 may create billing information for a particular user, user group, vault access, public vault access, etc. For instance, the DS managing unit 18 may track the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 may receive and aggregate network management alarms, alerts, errors, status information, performance information, and messages from the devices 12-14 and/or the units 16, 20, 22. For example, the DS managing unit 18 may receive a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 may determine that the DSN memory 22 needs more DS units 36 or that one or more of the DS units 36 needs updating.

The second primary function of distributed data storage and retrieval function begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon. The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-11.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encoded and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45 of a data file or data block of a user device to verify that one or more slices has not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
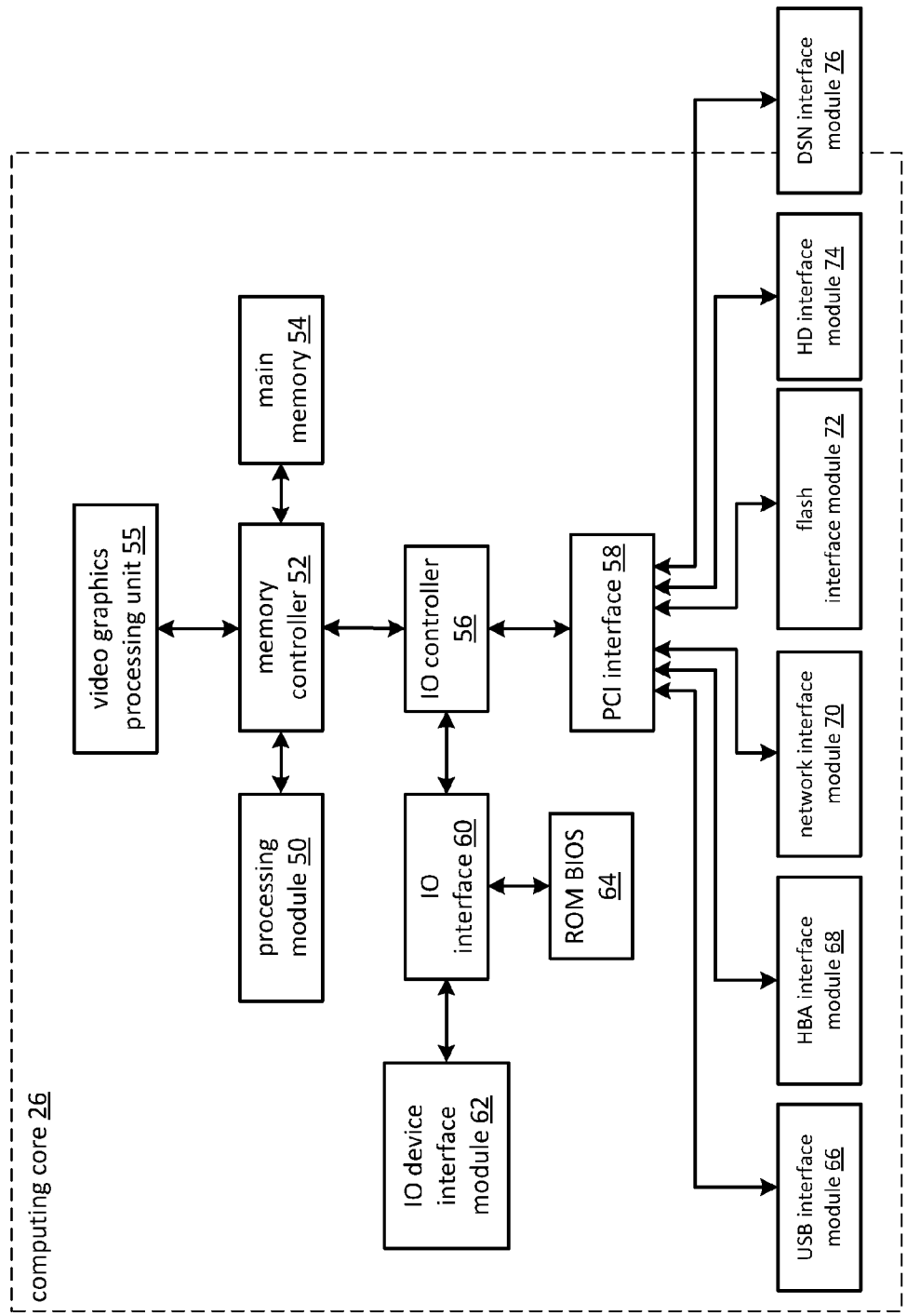
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-11.

Figure 3:
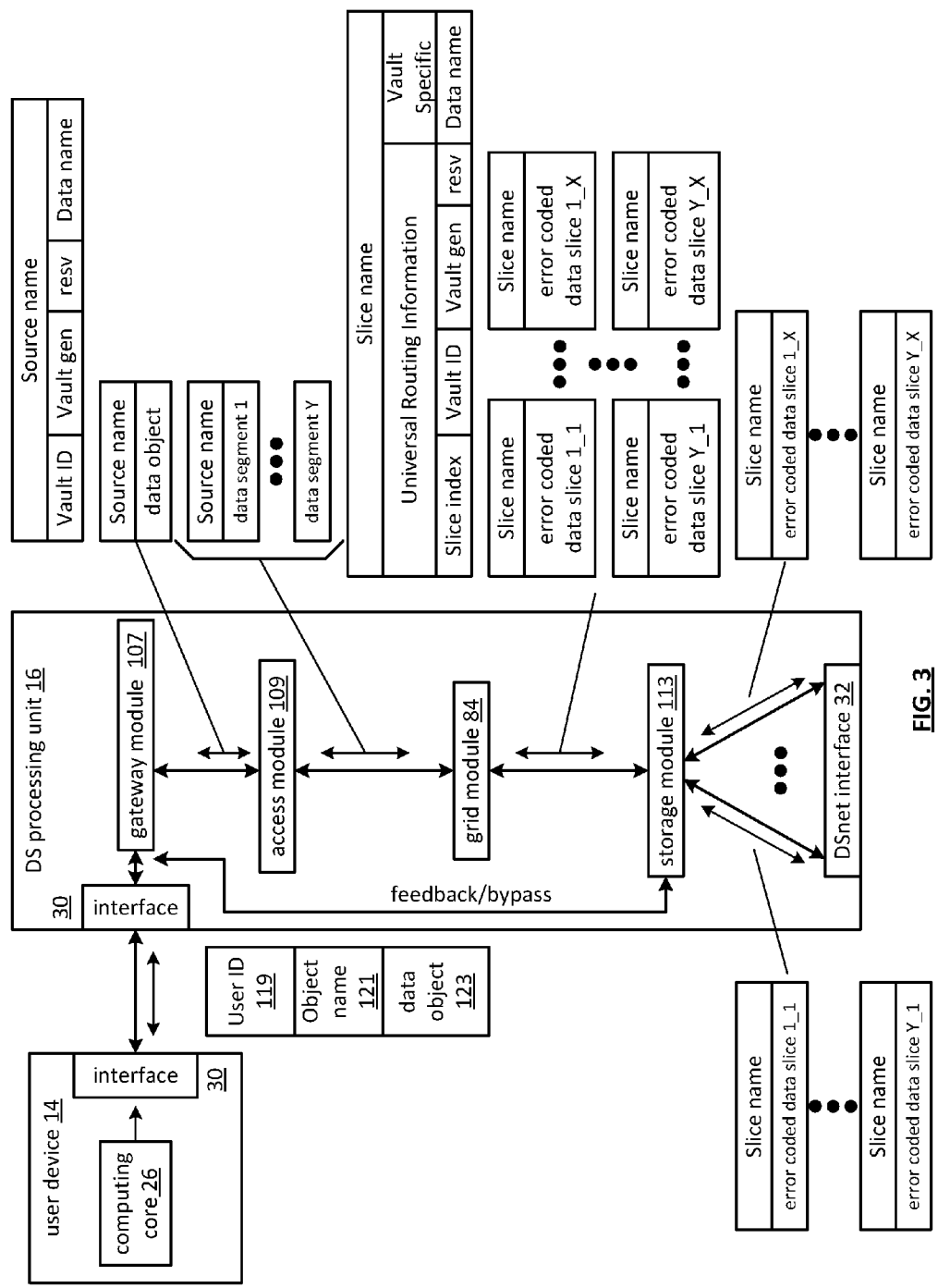
FIG. 3 is a schematic block diagram of an embodiment of a distributed storage processing unit in accordance with the invention.

FIG. 3 is a schematic block diagram of an embodiment of a dispersed storage (DS) processing unit 16 and/or of the DS processing module 34 of user device 12 (see FIG. 1). The DS processing unit 16 includes a gateway module 107, an access module 109, a grid module 84, a storage module 113, and a bypass/feedback path. The DS processing unit 16 may also include an interface 30 and the DSnet interface 32.

In an example of storing data, the gateway module 107 of the DS processing unit 16 receives an incoming data object (e.g., a data file, a data block, an EC data slice, etc.), authenticates the user associated with the data object, obtains user information of the authenticated user, and assigns a source name to the data object in accordance with the user information. To authenticate the user, the gateway module 107 verifies the user ID 119 with the managing unit 18 (see FIG. 1) and/or another authenticating unit. If the user ID is verified, the gateway module 107 retrieves the user information from the managing unit 18 (see FIG. 1), the user device 14, and/or the other authenticating unit based on the user ID.

The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module 107 determines the source name to associate with the data object based on the vault identifier and the data object. For example, the source name may contain a data name (block number or a file number), the vault generation number, a reserved field, and a vault identifier. The data name may be randomly assigned but is associated with the user data object.

The gateway module 107 may utilize the bypass/feedback path to transfer an incoming EC data slice to another DS storage unit 36 (see FIG. 1) when the DS processing module 34 determines that the EC data should be transferred. Alternatively, or in addition to, the gateway module 60 may use the bypass/feedback path to feedback an EC slice for sub-slicing.

The access module 109 receives the data object and creates a series of data segments 1 through Y therefrom. The number of segments Y may be chosen or random based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 84, as previously discussed, may pre-manipulate (e.g., compression, encryption, cyclic redundancy check (CRC), etc.) the data segment before creating X error coded data slices for each data segment. The grid module 84 creates XY error coded data slices for the Y data segments of the data object. The grid module 84 adds forward error correction bits to the data segment bits in accordance with an error coding algorithm (e.g., Reed-Solomon, Convolution encoding, Trellis encoding, etc.) to produce an encoded data segment. The grid module 84 determines the slice name and attaches the unique slice name to each EC data slice.

The number of pillars, or slices X per data segment (e.g., X=16) is chosen as a function of the error coding objectives. The DS processing module may utilize different error coding parameters for EC data slices and EC data sub-slices based on guidance from one or more of a user vault (e.g., stored parameters for this user), a command from the DS managing unit or other system element, priority of the EC data slice, type of data in the EC data slice, and/or retrieval speed requirements. A read threshold T (e.g., T=10) of the error coding algorithm is the minimum number of error-free error coded data slices required to be able to reconstruct a data segment. The DS processing unit can compensate for X-T (e.g., 16−10=6) missing, out-of-date, and/or corrupted error coded data slices per data segment.

The grid module 84 receives each data segment 1-Y and, for each data segment generates X number of error coded (EC) slices using an error coding function. The grid module 84 also determines the DS storage units 36 for storing the EC data slices based on a dispersed storage memory mapping associated with the user's vault and/or DS storage unit 36 attributes, which include availability, self-selection, performance history, link speed, link latency, ownership, available DSN memory, domain, cost, a prioritization scheme, a centralized selection message from another source, a lookup table, data ownership, and/or any other factor to optimize the operation of the computing system.

The storage module 113 may perform integrity checks on the EC data slices and then transmit the EC data slices 1 through X of each segment 1 through Y to the DS storage units. The DS storage units 36 may store the EC data slices and locally keep a table to convert virtual DSN addresses into physical storage addresses. Note that the number of DS storage units 36 is equal to or greater than the number of pillars (slices X per segment) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36 (see FIG. 1).

In an example of a read operation, the user device 10 or 12 sends a read request to the DS processing unit 14, which authenticates the request. When the request is authentic, the DS processing unit 14 sends a read message to each of the DS storage units 36 storing slices of the data object being read. The slices are received via the DSnet interface 34 and processed by the storage module 113, which performs a parity check and provides the slices to the grid module 84. The grid module 84 de-slices and decodes the slices of a data segment to reconstruct the data segment. The access module reconstructs the data object from the data segments and the gateway module 107 formats the data object for transmission to the user device.

Figure 4:
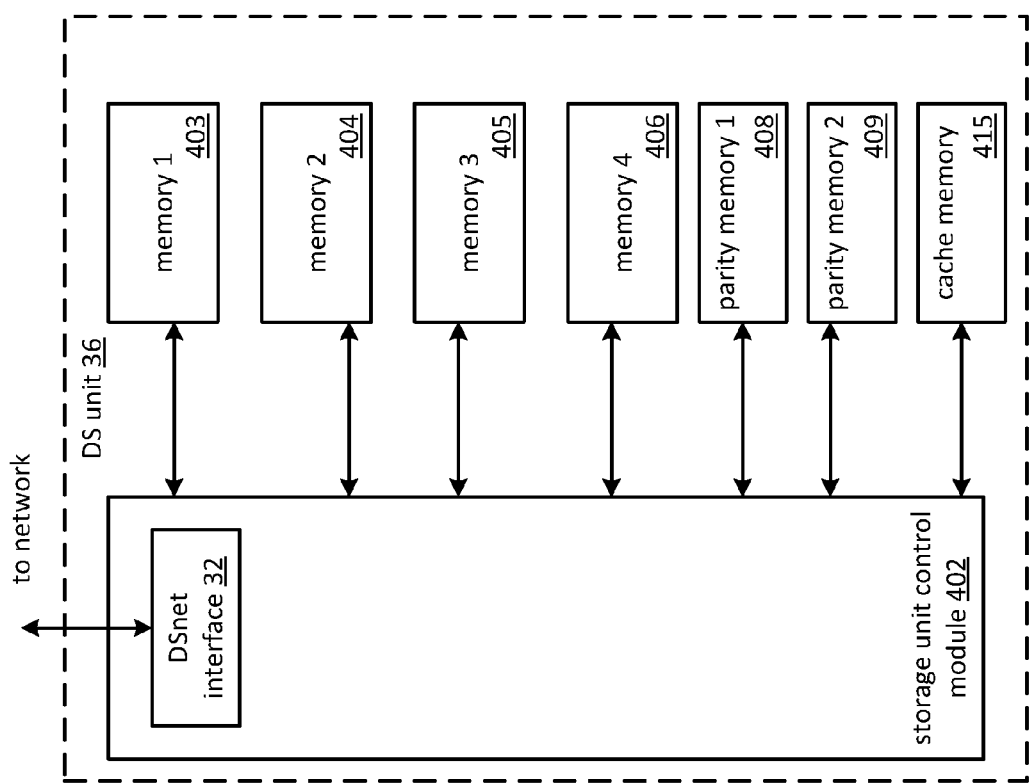
FIG. 4 is a schematic block diagram of an embodiment of a distributed storage unit in accordance with the invention.

FIG. 4 is a schematic block diagram of an embodiment of a distributed storage unit 36 that includes a storage unit control module 402, a plurality of memories 403, 404, 405, and 406, a plurality of parity memories 408 and 409, and a cache memory 415. In another embodiment, there may be 8, 16, or more memories.

The storage unit control module 402 may be implemented with the computing core of FIG. 2. The memories 403-406 may be one or more of a magnetic hard disk, NAND flash, read only memory, optical disk, and/or any other type of read-only, or read/write memory. The memories may be implemented as part of or outside of the DS storage unit. For example, memory 1 may be implemented in the DS unit and memory 4 may be implemented in a remote server (e.g., a different DS unit operably coupled to the DS unit via the network). In an example, memories 403-406 and parity memories 408-409 are implemented with the magnetic hard disk technology and the cache memory 415 is implemented with the NAND flash technology.

In some embodiments, a DS unit includes cache memory 415 implemented using a single solid state drive (SSD). In other embodiments, all of the memories are implemented using the same type of device, and one or more of the memories is temporarily selected for use as "cache memory" for purposes of temporarily storing data to be written. The temporarily selected memory can serve as a cache memory until the DS unit shifts responsibility for caching writes to another memory.

The storage unit control module 402 includes the DSnet interface 32 and a processing module. The storage unit control module 402 may be operably coupled to the computing system via the DSnet interface 32 via the network. The storage unit control module 402 may receive EC data slices to store via the DSnet interface 32. In an embodiment, the storage unit control module 402 determines where (e.g., which address on which of the memories) to store the received EC data slice. The determination may be based on one or more of the metadata, a command (e.g., from the DS processing unit indicating which memory type to use), a type of data indicator, a priority indicator, a memory state indicator, available memory, memory performance data, memory cost data, the memory characteristics, and/or any other parameter to facilitate desired levels of efficiency and performance. The memory state may indicate whether the memory is in a write only state, a read only state, a write with read priority state, or some other state to indicate the availability.

The storage unit control module 402 creates and maintains a local virtual DSN address to physical memory table. The storage unit control module 402 determines where previously stored EC data slices are located based on the local virtual DSN address to physical memory table upon receiving a retrieve command via the network. The storage unit control module 402 may save activity records (e.g., memory utilization, errors, stores, retrievals, etc.) as logs in any of the memories.

The storage unit control module 402 may utilize the parity memories 408-409 to store and retrieve parity across the data stored in memories 403-406. The storage unit control module 402 may immediately recreate a slice that is stored in a memory in the write only state based on reading the other memories in the read only state, reading the parity memory 1 and/or parity memory 2, and calculating the desired slice. The storage unit control module 402 may temporarily pair a write only state memory 403-406 with a write only state parity memory 408-409 to enable rapid writes of new slices (e.g., write a slice to memory 1 and write the parity to parity memory 1), while another parity memory in the read only state may be available to provide the needed parity to reconstruct slices that are stored on the write only state memory.

In an example, the storage unit control module 402 may choose memory 1 (e.g., a magnetic hard disk drive) to store the received EC data slice since memory 1 is in a write only state (e.g., available immediately), the memories 2-4 are in the read only state, parity memory 1 is paired with memory 1 in the write only state, parity memory 2 is in the ready only state, and the memory 1 memory characteristics favorably match the metadata of the EC data slice, including performance, efficiency, cost, and response time. The storage unit control module 402 queues a read request in the cache memory when the requested slice is in the memory 1 (but in the write state). The storage unit control module 402 may process the queued read request for memory 1 by retrieving the request from the cache memory, reading the memories 2-4 (e.g., the same memory stripe or common address range across each), reading the party memory 2, and calculating the desired slice.

Note that the storage unit control module 402 may queue write requests and slices when a desired memory 403-406 is in the read only state. The storage unit control module may subsequently change the state of memory 1 from write only to the read only state, or the write with read priority state to enable processing of the queued read request. Note that the DS unit 36 can immediately retrieve slices where the slices are stored in memories in the read only state, or in the write with read priority state (e.g., memories 2-4). Further note that the DS unit 36 may rotate the write only state amongst the memories 1-4 and the parity memories 1-2 from time to time to even out the cumulative storage and optimize performance. A method to choose the memories and change the memory state will be discussed in greater detail with reference to FIGS. 5-11.

Figure 5:
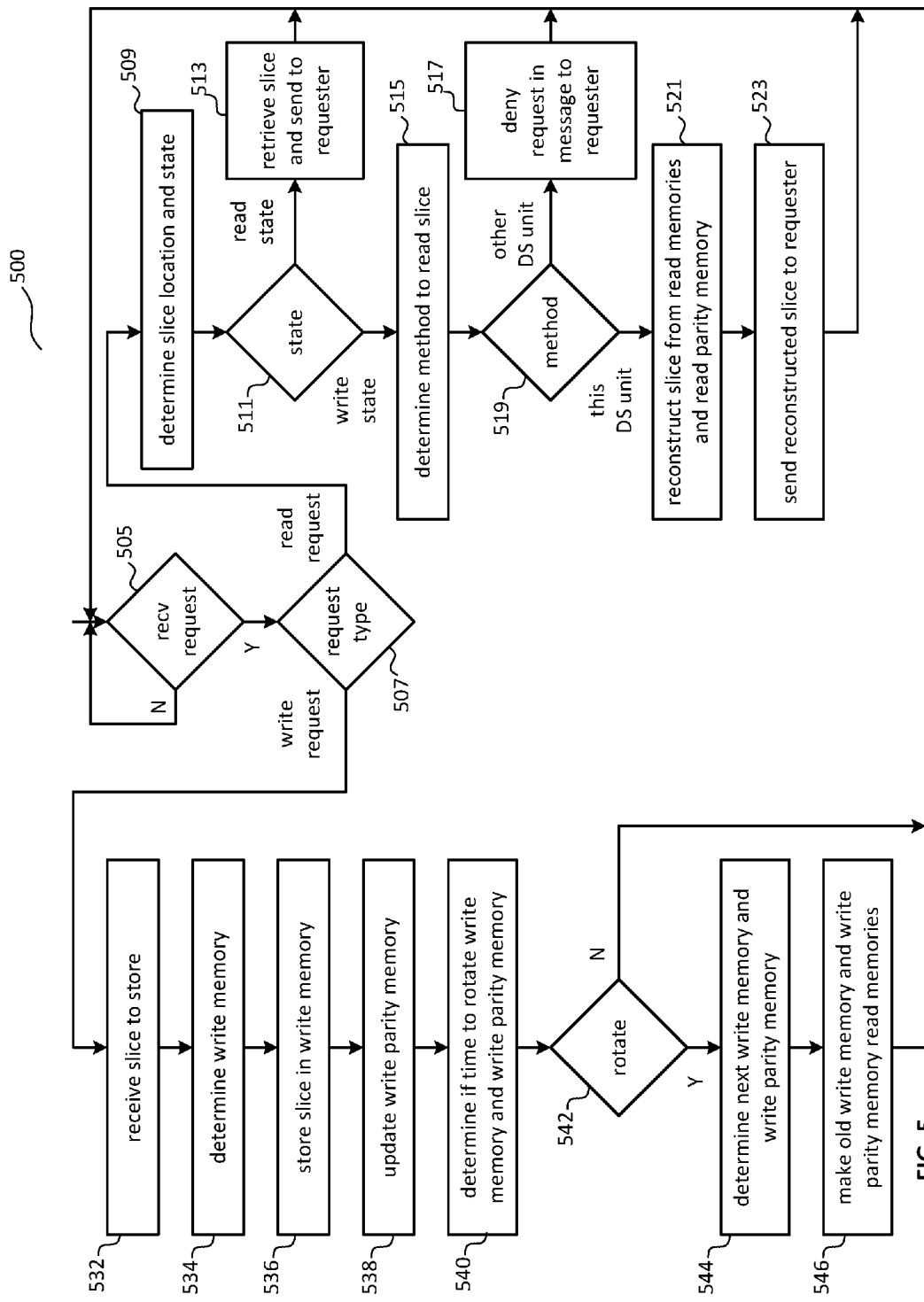
FIG. 5 is a flowchart illustrating the reading and writing of memory.

FIG. 5 is a flowchart illustrating a method 500 of reading and writing to memory where the DS unit 36 (see FIG. 4) may control the DS unit memory state and memory utilization to optimize the performance of the memory.

The method begins where the storage unit control module 402 (see FIG. 4) checks for a received request. As illustrated by block 505, the DS unit may receive the request from one or more of the DS processing unit 16, the user device 12, the storage integrity processing unit 20, and/or the DS managing unit 18 (see FIG. 1). As illustrated by block 507, the storage unit control module determines the request type based on the request when the request is received. The method branches to block 532, which illustrates receiving a slice to store when the storage unit control module determines the request type is a write request.

As illustrated by block 509, the storage unit control module determines the slice location and state when the request type is a read request. As illustrated by block 511, the determination is based in part on accessing the local virtual DSN address to physical location table to identify the memory, the address, and the memory state. As illustrated by block 513, the storage unit control module retrieves the slice based on the memory and address when the memory state is the read state. The storage unit control module sends the slice to the requester and the method branches back to look for more requests.

As illustrated by block 515, the storage unit control module determines the method to read the slice when the memory state is the write state. Note that in this state the memory is only writing at this time to optimize the throughput performance of the memory requiring the requested slice to be obtained in another way other than reading it directly from the memory where the slice was initially stored (e.g., which may disrupt the write state performance when the memory is a hard disk drive). As illustrated by block 519, the determination of the method to read the slice is based on one or more of a predetermination, a command, a DS unit status indicator, a loading indicator for the memories in the read state, a priority indicator, and/or any other indicator to optimize the memory performance. As illustrated by block 517, the storage unit control module may send a read request response message to the requester where the response denies the request when the storage unit control module determines the method to be to utilize another DS unit. Note that in this scenario the DS unit does not return the requested slice to the requester but instead informs the requester that no slice will be returned. The requester must rely on reconstructing the original data object based on the retrieving the slices from the other pillars and performing the de-slicing and decoding steps. In another embodiment, the requester may repeat the read request to the DS unit with a priority indicator set when the process to reconstruct the data object fails since a read threshold of k good slices are not retrieved from the DS units.

In various embodiments, including embodiments in which a DS unit uses an SSD cache or where responsibility for caching writes is delegated to various different memories within a DS unit, the DS unit always responds to read requests, and implementation of block 517 is not required.

As illustrated by block 521, the storage unit control module may reconstruct the slice from a reverse parity operation based on reading a portion of the memories (e.g., a logical stripe across the memories) and parity memory in the read state when the storage unit control module determines the method to be to utilize the DS unit now. As illustrated by block 523, the storage unit control module sends the slice to the requester and returns to the step to look for received requests.

Handling the write request begins, as illustrated by block 532, with the storage unit control module receiving the slice to store in the write request. As illustrated by block 534, the storage unit control module determines the present write state memory based on the local virtual DSN address to physical address table. As illustrated by block 536, the storage unit control module stores the slice in the write state memory and updates the write parity memory by reading a corresponding portion of the read state memories (e.g., same logical stripe across the memories) and calculating the parity across the slice just written to the write state memory and the read state memories. The storage unit control module stores the parity to the write state parity memory, as shown by block 538.

As illustrated by block 540, the storage unit control module determines if it is time to rotate the write state memory and write state parity memory to different memories. The determination may be based on one or more of a timer expiration since the last rotation, a command, a memory utilization indicator (e.g., the present write state memory is filling up), a read request history indicator (e.g., many read requests for slices in the write state memory), and/or any other indicator to optimize the memory performance. As illustrated by block 542, the method branches back to look for received requests when the storage unit control module determines it is not time to rotate the write state memory.

As illustrated by block 544, the storage unit control module determines the next write state memory and write state parity memory when the storage unit control module determines it is time to rotate the write state memory. The determination may be based on one or more of identifying which memory was in the write state least recently, a predetermination, a rotation order indicator, a command, a memory utilization indicator (e.g., choose a memory with the most available unused space), a read request history indicator (e.g., avoid a memory with a higher read request frequency than other memories), and/or any other indicator to optimize the memory performance. The storage unit control module updates the local virtual DSN address to physical location table with the chosen write state memory and write state parity memory. As illustrated by block 546, the storage unit control module updates the local virtual DSN address to physical location table to modify the state of the previous write state memory and write state parity memory from write state to the read state. Additionally, slices can be moved back to their proper drives. The method branches back to look for received requests.

In another embodiment, the number of write state memories may be two or more to further improve the write performance of the DS unit. The storage unit control module may only rotate one memory at a time from the write state to the read state or the storage unit control module may rotate more than one memory at a time from the write state to the read state.

Figure 6:
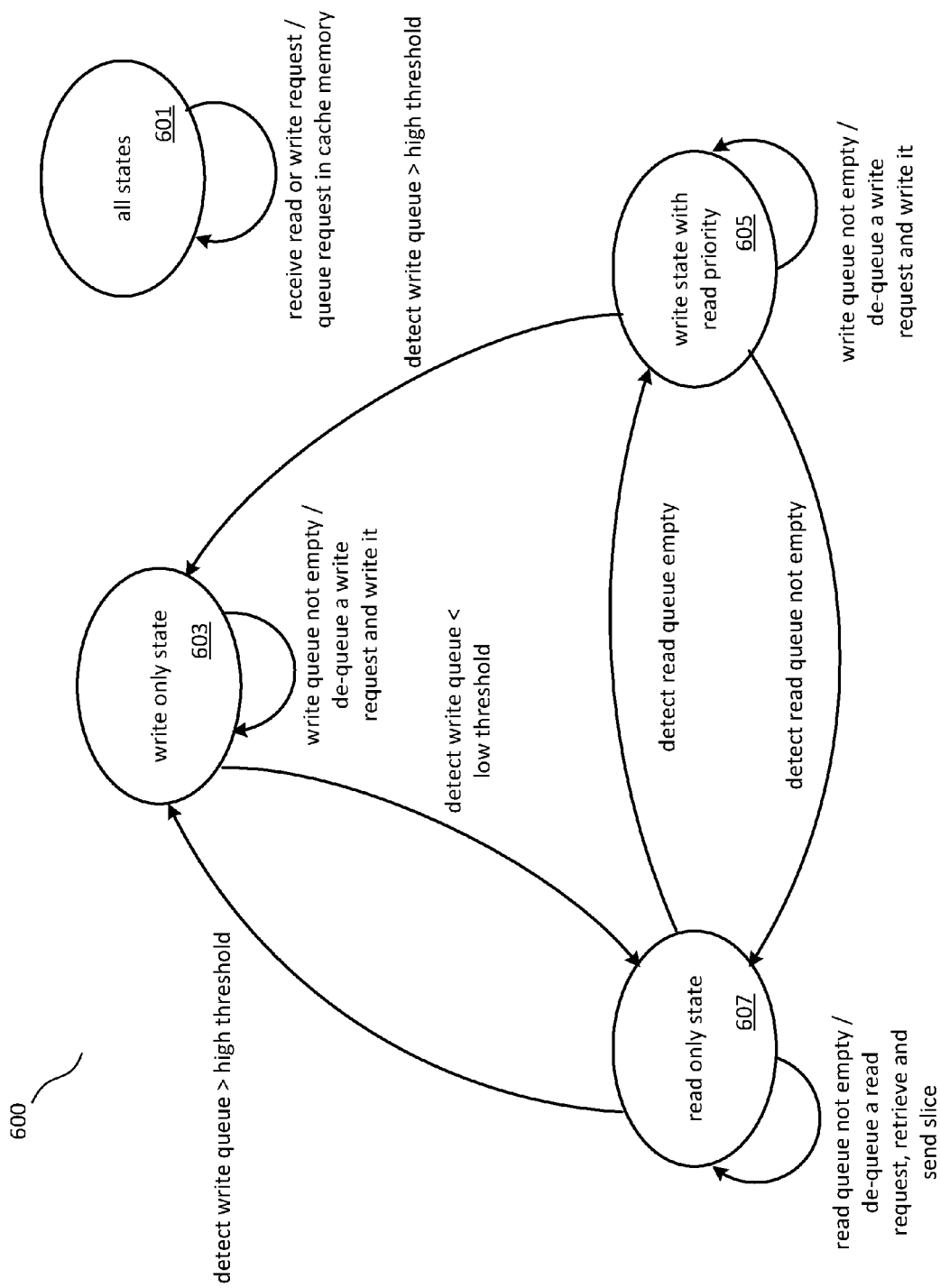
FIG. 6 is a state transition diagram illustrating the reading and writing of memory.

FIG. 6 is a state transition diagram 600 illustrating the reading and writing of memory where the DS unit may control the DS unit memory state 601 and memory utilization to optimize the performance of the memory. There are three states of the memory: the read only state 607, the write only state 603, and the write state with read priority 605.

The storage unit control module determines the memory state and processes received read and write requests based on the memory state to optimize the memory performance. For example, when the memory is in the read only state 607, the storage unit control module processes only read requests, unless too many write requests are pending (e.g., the number write requests is greater than a high threshold). In another example, when the memory is in the write only state 603, the storage unit control module processes only write requests until the pending write requests are reduced to a low threshold level. In another example, when the memory is in the write state with read priority 605, the storage unit control module opportunistically processes any pending write requests unless there are pending read requests.

In various embodiments, including embodiments in which a DS unit uses an SSD cache or where responsibility for caching writes is delegated to various different memories within a DS unit, the DS unit always responds to read requests. In such embodiments, a particular piece of memory being in write only mode 603 means that a read will be delayed, and data will always be stored immediately in read cache memory.

Note that in all memory states 601, the storage unit control module queues received read requests into a read queue and received write requests into a write queue by storing the request (and slice in the case of a write request) in the cache memory as indicated by the upper right portion of FIG. 6. The requests may be subsequently de-queued and processed as discussed below.

Starting with the read only state, the storage unit control module determines if the read queue is not empty and de-queues the read request, determines the memory location, retrieves the slice, and sends the slice to the requester when the storage unit control module determines the read queue is not empty. The storage unit control module determines if the write queue is above the high threshold of write requests while the memory is in the read only state. The storage unit control module changes the state of the memory from the read only state to the write only state when the storage unit control module determines that the write queue is above the high threshold of write requests. The storage unit control module determines if the read queue is empty while the memory is in the read only state. The storage unit control module changes the state of the memory from the read only state to the write state with read priority when the storage unit control module determines that the read queue is empty.

While in the write only state (e.g., the second state of three states) the storage unit control module determines if the write queue is not empty and de-queues the write request with slice from the cache memory, determines the memory location, stores the slice, and updates the local virtual DSN address to physical storage table when the storage unit control module determines the write queue is not empty. The storage unit control module determines if the write queue is below the low threshold of write requests while the memory is in the write only state. The storage unit control module changes the state of the memory from the write only state to the read only state when the storage unit control module determines that the write queue is below the low threshold of write requests.

While in the write state with read priority (e.g., the third state of three states) the storage unit control module determines if the write queue is not empty and de-queues the write request with slice from the cache memory, determines the memory location, stores the slice, and updates the local virtual DSN address to physical storage table when the storage unit control module determines the write queue is not empty. The storage unit control module determines if the read queue is not empty while the memory is in the write state with read priority. The storage unit control module changes the state of the memory from the write state with read priority to the read only state when the storage unit control module determines that the read queue is not empty.

Figure 7:
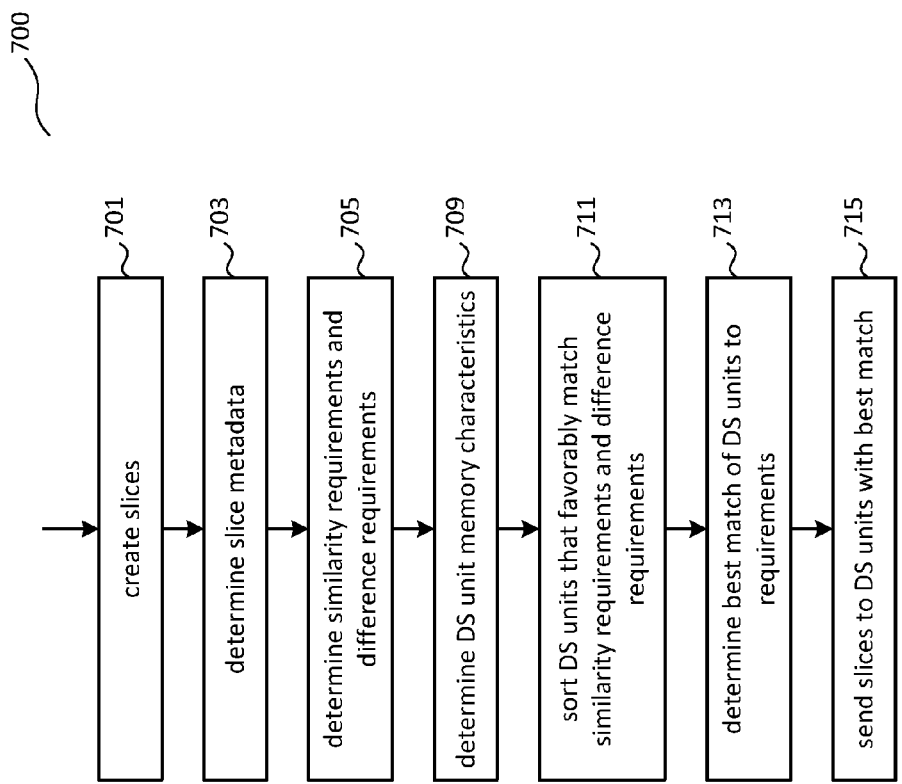
FIG. 7 is a flowchart illustrating the writing of memory.

FIG. 7 is a flowchart illustrating a method 700 of writing memory where the DS processing unit (or DS unit) may employ a memory diversity scheme to choose memories to store slices such that the overall system reliability is improved. For example, the memory diversity scheme may ensure that a read threshold of k slices are stored in pillar memories that are each of a different model to avoid unrecoverable data due to a potentially common memory design defect.

As illustrated by block 701, the DS processing unit creates the slices for distributed storage. As illustrated by block 703, the DS processing unit determines the slice metadata based on one or more of a file type, file size, priority, a security index, estimated storage time, estimated time between retrievals and more. As illustrated by block 705, the DS processing unit determines the similarity requirements and difference requirements, sometimes referred to as diversity preferences, based on the metadata. Similarity requirements drive similar attributes of the pillar memory choices and difference requirements drive difference attributes of the pillar memory choices. For example, a preference or requirement for a relatively short estimated time between retrievals may drive pillar memory choices that all share a similar fast retrieval characteristic to speed frequent retrievals. Other examples of similarity preferences and requirements may include similar cost and similar capacity. In another example, a preference or requirement for very high reliability may drive pillar memory choices that all have a different memory model to improve the reliability of retrievals. Other examples of difference requirements and preferences may include different operating systems and different installation sites.

As illustrated by block 709, the DS processing unit determines the DS unit memory characteristics for one or more candidate DS units. The determination may be via a table lookup or a real time request to each DS unit to query for the memory characteristics. The memory characteristics may include one or more of memory model, memory type, total capacity, available capacity, access speed, error history, estimated mean time between failures, actual mean time between failures, and/or hours of operation.

As illustrated by block 711, the DS processing unit sorts the DS units that favorably match the similarity requirements and difference requirements based on comparing the requirements to the memory characteristics. For example, DS units with memory that has a fast access memory characteristic may be sorted to favorably match the fast access similarity requirement. In another example, DS units with memory that has a different model memory characteristic may be sorted to favorably match the reliability-driven different-model requirement or preference.

As illustrated by block 713, the DS processing unit determines the best match of DS unit memories to the diversity preferences or requirements based on the sort if possible, or at least a favorable match. For example, the DS processing unit may choose at most n-k DS unit memories with the same model, similar error histories, or similar total hours to improve the reliability of data object retrieval. In other words, the DS unit may choose the read threshold k of DS unit memories that has the most different models, error histories, and total hours as the memory diversity scheme.

As illustrated by block 715, the DS processing unit sends the slices to the chosen DS units with the best match of memory characteristics to requirements and updates the virtual DSN address to physical location table with the locations of the slices.

In at least some embodiments where a DS unit includes multiple memory devices, the DS unit may implement similar functionality to that discussed above to select available memory units that favorably match the diversity preferences determined from the slice metadata.

Figure 8B:
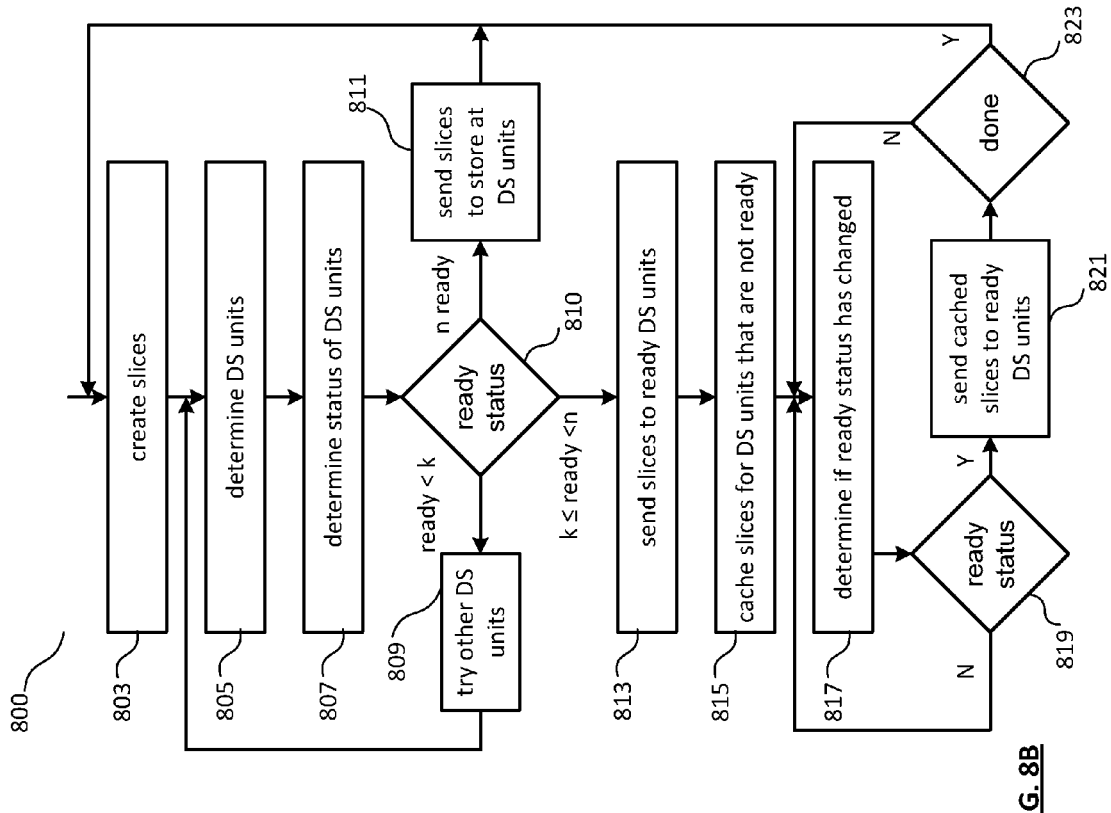
FIG. 8B is another flowchart illustrating the writing of memory.
Figure 8A:
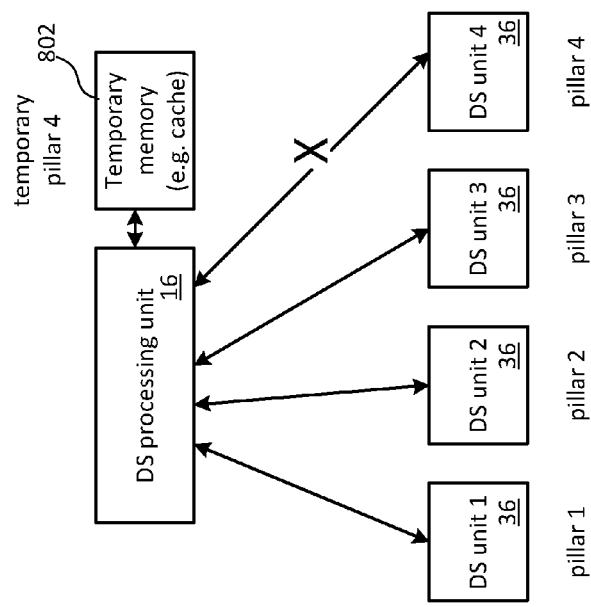
FIG. 8A is a schematic block diagram of an embodiment of a distributed storage system in accordance with the invention.

FIG. 8A is a schematic block diagram of an embodiment of a distributed storage system that includes the DS processing unit 16, a temporary memory 802, and a plurality of DS units 36. Consider an example in which DS unit 4 may not be available due to a site outage, a DS unit failure, and/or the network is not available at DS unit 4 site. The DS processing unit 16 may temporarily store new pillar 4 slices in the temporary memory, and/or yet another DS unit, for subsequent storage in DS unit 4. As used herein, the term "cache memory" refers to a memory that can be used temporarily store information and includes but is not limited to, cache memories such as those included in various processor architectures, memory specifically designated as cache memory, and the like. The term "cache memory" is also used in a less rigorous sense to refer to any type of memories used for substantially non-permanent information storage. The method of operation to determine where to temporarily store the slices will be discussed in greater detail with reference to FIGS. 8B and 9B.

FIG. 8B is another flowchart illustrating a method 800 of writing to memory where the DS processing unit 16 determines where to store newly created slices when at least one primary DS unit 36 is not available.

The method 800 begins as illustrated by block 803, where the DS processing unit creates the n slices for each data segment for storage. As illustrated by block 805, the DS processing unit determines the desired primary DS units in which to store the slices based in part on a predetermination of the slice name in the user vault, or in the virtual DSN address to physical location table.

As illustrated by block 807, the DS processing unit determines the status of the chosen primary DS units based on one or more of a status table lookup and/or a real time query to the DS unit. For example, the status indicates not available if the network is down to the DS unit, or if the DS unit is down. As illustrated by block 810, the DS processing unit determines the number of primary DS units that are in the ready status. As illustrated by block 809, the DS processing unit tries other DS units and returns to the step to determine which DS units when the number of ready primary DS units is less than the read threshold k. Note that the threshold for this scenario may be k+1, k+2, or etc. in another embodiment to further improve the probability of subsequent data object recreation.

As illustrated by block 811, the DS processing unit sends the n slices to the chosen primary DS units when the DS processing unit determines that the number of ready primary DS units is all n (e.g., all pillars ready). The method then continues to the step to create more slices.

As illustrated by block 813, the DS processing unit sends slices to the available chosen primary DS units when the DS processing unit determines that the number of ready primary DS units is greater than or equal to the read threshold k but is less than all n. As illustrated by block 815, the DS processing unit temporarily stores slices by storing slices in temporary memory for any chosen primary DS units that are not available.

As illustrated by block 817, the DS processing unit determines if the status of any unavailable chosen primary DS units has changed to ready. As illustrated by blocks 819 and 821, the DS processing unit retrieves the slices from temporary memory and sends the slices to the ready DS unit when the DS processing unit determines that the status of the unavailable chosen primary DS unit has changed to ready. As illustrated by block 823, the DS processing unit determines if all the temporarily cached slices have been stored in the chosen DS unit and continues to the step of determining if the status has changed when all the cached slices have not been stored in the chosen DS units. In another embodiment, a timeout may occur where the DS processing unit gives up on waiting for the ready status to change in which case the DS processing unit may try another DS unit or just not store a pillar of slices (e.g., deleting them from the temporary memory). The DS processing unit method goes back to the step of creating slices when all the cached slices have been stored in the chosen DS units.

In some embodiments, some or all slices stored in temporary memory may be discarded according to a discard policy. The discard policy may specify that slices are to be discarded after a threshold period of time, based on an amount of available storage, or based on reliability of the data. For example, a data slice may be discarded only when it is no longer possible to use the data slice, when the data slice is no longer needed, or when the data slice is deemed unreliable. Some data slices may be given retention preference over other data slices, so that very data slices associated with reliable data slices already in long term storage may be discarded in favor of data slices that may be needed to correct unreliable data slices.

FIG. 9A is a schematic block diagram of another embodiment of a distributed storage system that includes the DS processing unit 16, the plurality of DS units 36, and a plurality of associated temporary memories 904. In one example of operation, the DS unit 4 may not be available due to a site outage, a DS unit failure, and/or the network is not available at DS unit 4 site. The DS processing unit 16 may temporarily store new pillar 4 slices in one of the temporary memories 904, and/or yet another DS unit, for subsequent storage in DS unit 4. The method of operation to determine where to temporarily store the slices will be discussed in greater detail with reference to FIG. 9B.

FIG. 9B is another flowchart illustrating a method 900 of writing to memory where the DS processing unit determines where to store newly created slices when at least one primary DS unit is not available.

The method begins as illustrated by block 903, where the DS processing unit creates the n slices for each data segment for storage. As illustrated by block 905, the DS processing unit determines the desired primary DS units in which to store the slices based in part on a predetermination of the slice name in the user vault, or in the virtual DSN address to physical location table.

As illustrated by block 907, the DS processing unit determines the status of the chosen primary DS units based on one or more of a status table lookup and/or a real time query to the DS unit. For example, the status indicates not available if the network is down to the DS unit or if the DS unit is down. As illustrated by block 910, the DS processing unit determines the number of primary DS units that are in the ready status. As illustrated by block 909, the DS processing unit tries other DS units and returns to the step to determine which DS units when the number of ready primary DS units is less than the read threshold k. Note that the threshold for this scenario may be k+1 or k+2, etc. in another embodiment to further improve the probability of subsequent data object recreation.

As illustrated by block 911, the DS processing unit sends the n slices to the chosen primary DS units when the DS processing unit determines that the number of ready primary DS units is all n (e.g., all pillars ready). The method 900 then continues to create more slices, as illustrated by block 903.

As illustrated by block 913, the DS processing unit sends slices to the available chosen primary DS units when the DS processing unit determines that the number of ready primary DS units is greater than or equal to the read threshold k but is less than all n.

As illustrated by block 915, the DS processing unit determines which temporary memory 1-3 to utilize to temporarily store the slices for the DS unit 4 that is not ready. The determination may be based on one or more of an even rotation across the ready DS unit temporary memories (e.g., temporary/cache memory 1, then 2, then 3, then 1 etc.), one pillar high or low from the DS unit that is not ready, a list, a command, and/or the performance of the temporary memory. The DS processing unit caches slices by storing slices in the chosen temporary memory for any chosen primary DS units that are not available.

As illustrated by block 917, the DS processing unit determines if the status of any unavailable chosen primary DS units 36 has changed to ready. As illustrated by blocks 919 and 921, the DS processing unit retrieves the slices from the temporary memory and sends the slices to the ready DS unit when the DS processing unit determines that the status of the unavailable chosen primary DS unit has changed to ready. As illustrated by block 923, the DS processing unit determines if all the temporarily cached slices have been stored in the chosen DS unit and continues to the step of determining if the status has changed when all the cached slices have not been stored in the chosen DS units. In another embodiment, a timeout may occur where the DS processing unit gives up on waiting for the ready status to change in which case the DS processing unit may try another DS unit or just not store a pillar of slices (e.g., deleting them from the temporary memory). The DS processing unit method goes back to the step of creating slices when all the cached slices have been stored in the chosen DS units.

Figure 10:
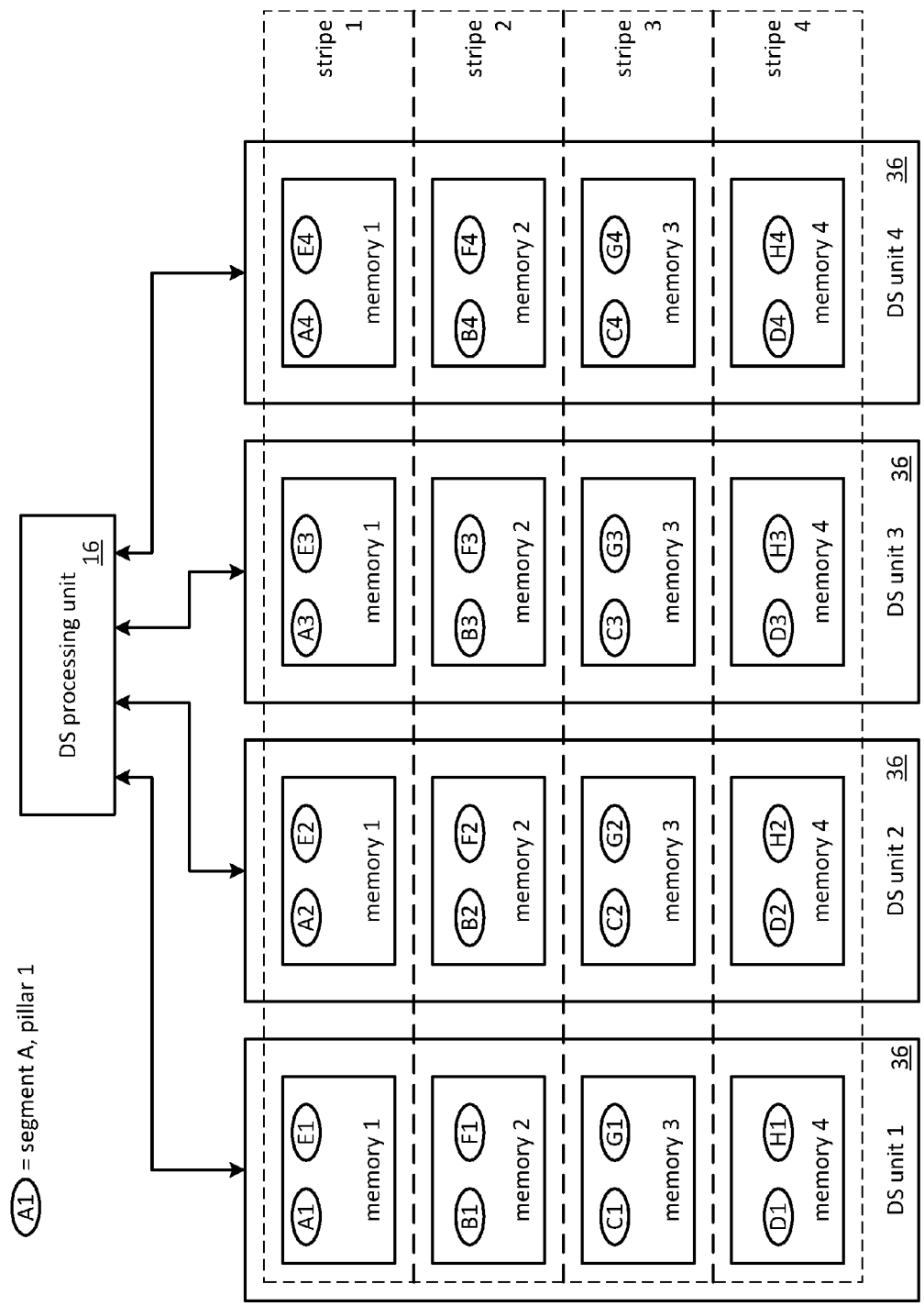
FIG. 10 is a schematic block diagram of another embodiment of a distributed storage system in accordance with the invention.

FIG. 10 is a schematic block diagram of another embodiment of a distributed storage system that includes the DS processing unit 16, and a plurality of DS units 36. The DS units 1-4 may each include a matching number of memories 1-4 in some embodiments. In another embodiment, the number of memories per DS unit may be 8, 16 or more.

The DS units can include a matching number of memories to facilitate organizing memories across the DS units 1-4 as storage groups or stripes 1-4. The stripes 1-4 may be physical as shown or logical such that the stripe boundaries are within the memory ranges of the memories.

The DS processing unit 16 and/or the DS units determine which memories across the DS units to utilize to store slices of the same data object. Note that the overall system reliability can be improved when the number of logical stripes is minimized such that same data segment slices are contained within the same stripe. In an embodiment (not illustrated), a logical stripe may include memory 1 of DS unit 1, memory 4 of DS unit 2, memory 2 of DS unit 3, and memory 3 of DS unit 4. This embodiment may be undesired as it can lead to lower system reliability since a memory failure can affect many data sets.

In another embodiment, a logical stripe may include memory 2 of DS unit 1, memory 2 of DS unit 2, memory 2 of DS unit 3, and memory 2 of DS unit 4. This embodiment may be more desired as it can lead to improved system reliability, since a memory failure can affect a more limited number of data sets.

In general, there are n choose m possible logical stripes where m is the number of memories per DS unit and n is the pillar width of the vault, and "choose" refers to the combinatorial operation for determining the number of distinct k-combinations. The system mean time to data loss=(stripe mean time to data loss)/(number of logical stripes). Minimizing the number of logical stripes may improve the system reliability. The DS processing unit and/or DS unit may determine the provisioning and utilization of the memories into logical stripes such as to minimize the number of logical stripes.

In an example of operation, the DS processing unit and/or DS managing unit provision memory 1 of each of DS unit 1-4 to be stripe 1, memory 2 of each of DS unit 1-4 to be stripe 2, memory 3 of each of DS unit 1-4 to be stripe 3, and memory 4 of each of DS unit 1-4 to be stripe 4. The DS processing unit and/or DS unit determines to store a pillar 1 slice of data segment A at stripe 1 of DS unit 1 (slice A1 at memory 1 of DS unit 1), slice A2 at memory 1 of DS unit 2, slice A3 at memory 1 of DS unit 3, and slice A4 at memory 1 of DS unit 4. In a similar fashion the DS processing unit and/or DS unit determines to store the slices of data segment E in stripe 1 (E1-E4), B1-B4 and F1-F4 in stripe 2, C1-C4 and G1-G4 in stripe 3, and D1-D4 and H1-H4 in stripe 4. A method of determining which stripe to utilize is discussed in greater detail with reference to FIG. 11.

In some embodiments, every DS unit receives slices from a contiguous set of segments of a data source. So, as illustrated in FIG. 10, DS unit 1 would receive, in order, A1, B1, C1, D1, E1, and so on. The striping algorithm can be used to even the load, such that no one memory has to handle all the input/output traffic. In an embodiment illustrated by FIG. 10, if slices from segments A-D come in at once, all 4 disks may begin storage operations, since each of the 4 memories gets something to store.

To achieve load balancing, some embodiments apply a random-like (but deterministic), or round-robin process to select which memory the slice will go to based on its name. It should be a deterministic process so that when reading, the DS unit knows which memory to access to find the source. For example, if the store had 8 disks, it might look at the 3 least significant bits of the segment's name (which would represent any number from 0-7 in binary). This result would determine which of the 8 disks a slice would be stored in.

In other embodiments, the least significant bits of the input source name are not used, because they are not guaranteed to have a uniform enough distribution. In some cases, the hash of the source name is used to create something with an even distribution, and, the least significant bits of the hash are examined. Other implementations use the result of taking the remainder when dividing the hash result by a smaller number.

Figure 11:
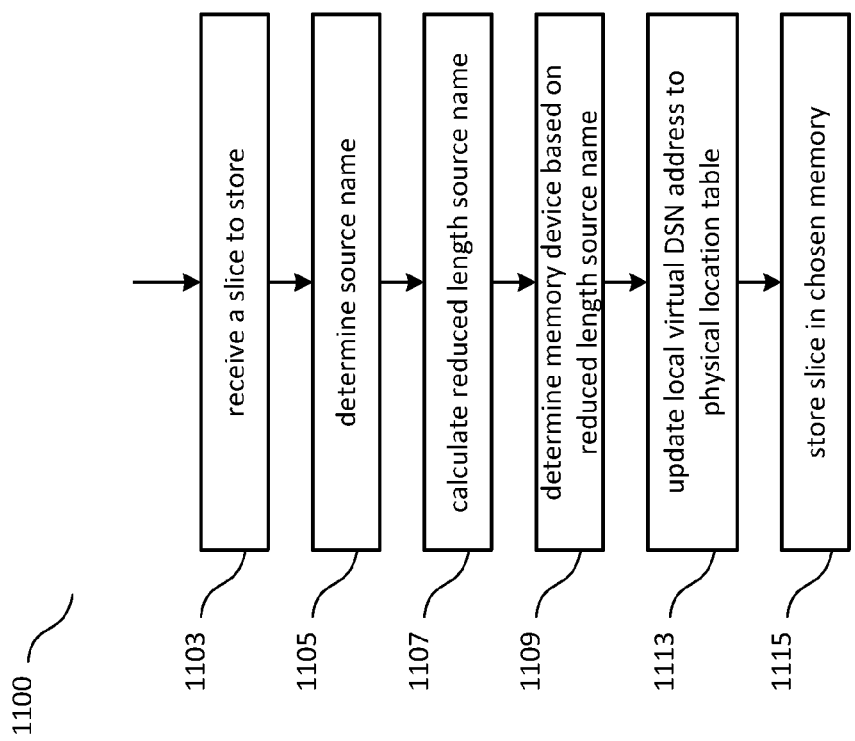
FIG. 11 is another flowchart illustrating the writing of memory.

FIG. 11 is another flowchart illustrating method 1100 of writing to memory where the DS processing unit and/or DS unit determine which stripe to utilize.

As illustrated by block 1103, the DS unit receives a slice to store from one of the DS processing unit, the user device, the DS managing unit, or the storage integrity processing unit. The slice is accompanied by one or more of the command/request to store it, the slice name, the source name, and or the slice metadata. As illustrated by block 1105, the DS unit determines the source name either by receiving the source name or deriving it from the slice name.

As illustrated by block 1107, the DS unit calculates a reduced length source name. The reduced length source name can be calculated, for example, using a hash (e.g., CRC) function of the source name which will always be the same number for the same source name (e.g., vault ID, vault gen, resv, and file ID). In other instances, the reduced length source name can be calculated using other suitable functions, for example, a modulo function. Generally, any reduction function that can be used to reduce the original source name to a smaller number that can be used to uniquely identify a particular memory can be used. In most cases, a reduction function can be chosen to maintain a random distribution among the various memories of a DS unit. The randomness of the file ID ensures that the hash will have desired distancing properties to spread out the slices of data objects evenly across the stripes.

As illustrated by block 1109, the DS unit determines the memory device based on the hash of the source name by truncating the hash to the number of bits required to specify the stripe range. For example, the least two significant bits of the hash may be utilized to specify the memory number.

As illustrated by block 1113, the DS unit updates the local virtual DSN address to physical location table with the memory number before storing the slice in the chosen memory, as illustrated by block 1115.

In various embodiments employing a deterministic technique to find the memory device based on the hash, as discussed for example with reference to block 1109, there a physical location table for each element is not maintained, because the name itself is all the information needed for the DS unit to determine the memory location. However, such a table can be maintained for a DS processing unit to determine which DS unit keeps a particular slice. Additionally rather than using an algorithm to determine which memory to use, an individual DS unit can further subdivide its namespace range so that one memory is responsible for some contiguous range of the namespace, with that range being a subset of the DS units entire assigned range. This technique may not allow for I/O load balancing to the same degree as other methods, since contiguous segments for the same source would likely all fall to one or a few memories, rather than most or all of them.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed:

1. A method for storing error coded data slices in a dispersed storage network (DSN), wherein a data segment is encoded using an error coding dispersed storage function to produce a plurality of error coded data slices, wherein each of the plurality of error coded data slices has a unique slice name, and wherein each of the unique slice names includes a common source name and unique addressing information, the method comprising:
   receiving, by a first dispersed storage unit of the DSN, a first error coded data slice of a plurality of error coded data slices and the unique slice name of the first error coded data slice;
   performing, by the first dispersed storage unit, a deterministic function on the common source name of the unique slice name of the first error coded data slice to select a memory device of a plurality of memory devices of the first distributed storage unit; and
   storing, by the first dispersed storage unit, the first error coded data slice in the memory device of the plurality of memory devices of the first dispersed storage unit based on the unique slice name of the first error coded data slice;
   receiving, by a second dispersed storage unit of the DSN, a second error coded data slice of a plurality of error coded data slices and the unique slice name of the second error coded data slice;
   performing, by the second dispersed storage unit, the deterministic function on the common source name of the unique slice name of the second error coded data slice to select a memory device of a plurality of memory devices of the second distributed storage unit; and
   storing, by the second dispersed storage unit, the second error coded data slice in the memory device of the plurality of memory devices of the second dispersed storage unit based on the unique slice name of the second error coded data slice.

2. The method of claim 1 further comprising:
   performing, by the first dispersed storage unit, a reducing function as the deterministic function to produce a reduced length source name;
   selecting, by the first dispersed storage unit, the memory device of the plurality of memory devices of the first distributed storage unit based on the reduced length source name;
   performing, by the second dispersed storage unit, the reducing function as the deterministic function to produce the reduced length source name; and
   selecting, by the second dispersed storage unit, the memory device of the plurality of memory devices of the second distributed storage unit based on the reduced length source name.

3. The method of claim 2, wherein the reducing function comprising one or more of:
   a hash function;
   a truncating function; and
   modulo function.

4. The method of claim 1, wherein the unique addressing information comprising:
   vault information.

5. The method of claim 1 further comprising:
   performing, by the first dispersed storage unit, a hash function as the deterministic function on the common source name to produce a hashed source name;
   performing, by the first dispersed storage unit, a truncating function on the hashed source name to produce a truncated source name; and
   selecting, by the first dispersed storage node, the memory device of a plurality of memory devices of the first distributed storage unit based on the truncated source name.

6. The method of claim 1, further comprising:
   updating, by the first dispersed storage unit, a digital-storage-network-address to physical-location table to record storage of the first error coded data slice in the memory device of the plurality of memory devices of the first distributed storage unit.

7. A distributed storage unit comprising:
   an interface to receive error coded data slice of a plurality of error data slices, wherein a data segment is encoded using an error coding dispersed storage function to produce the plurality of error coded data slices, wherein each of the plurality of error coded data slices has a unique slice name, and wherein each of the unique slice names includes a common source name and unique addressing information;
   a plurality of memory devices; and
   a processing module operable to:
      perform a deterministic function on the common source name of the unique slice name of the error coded data slice to select a memory device of the plurality of memory devices; and
      facilitate storing the error coded data slice in the memory device based on the unique slice name of the error coded data slice.

8. The distributed storage unit of claim 7, wherein the processing module is further operable to:
   perform a reducing function as the deterministic function to produce a reduced length source name; and
   select the memory device based on the reduced length source name.

9. The distributed storage unit of claim 8, wherein the reducing function comprising one or more of:

a hash function;
a truncating function; and
modulo function.

10. The distributed storage unit of claim 8, wherein the unique addressing information comprising:
vault information.

11. The distributed storage unit of claim 8, wherein the processing module is further operable to:
perform a hash function as the deterministic function on the common source name to produce a hashed source name;
perform a truncating function on the hashed source name to produce a truncated source name; and
select the memory device based on the truncated source name.

\* \* \* \* \*